United States Patent [19]

Horn et al.

[11] 4,449,849

[45] May 22, 1984

[54] METHOD OF REMOVING WATER FROM EARTHEN PITS

[75] Inventors: Spencer C. Horn, Ft. Cobb; Alan A. Mogg, Lookeba, both of Okla.

[73] Assignee: S & A Oil Field Services, Inc., Ft. Cobb, Okla.

[21] Appl. No.: 399,441

[22] Filed: Jul. 19, 1982

[51] Int. Cl.³ .............................................. E02B 1/00
[52] U.S. Cl. ........................................ 405/52; 405/128
[58] Field of Search ................ 405/52, 53, 74, 128, 405/129; 210/170, 194, 195.1; 239/16, 518, 521, 239/524

[56] References Cited

U.S. PATENT DOCUMENTS 1,233,119  7/1917  Parker ................................. 239/524
4,206,877  6/1980  Hoza ................................... 239/524

FOREIGN PATENT DOCUMENTS 2346054  12/1977  France ............................... 239/524

*Primary Examiner*—David H. Corbin
*Attorney, Agent, or Firm*—Robert M. Hessin

[57] ABSTRACT

A method of removing water from earthen pits such as the earthen pits commonly used in the drilling of oil and gas wells for containing reserve drilling fluid is provided. By the method, a plurality of spray nozzles are placed around the periphery of the pit, and the nozzles are directed towards the center of the pit. Water from the pit is pumped through the nozzles whereby the water is sprayed towards the center of the pit and removed therefrom by the evaporation thereof.

5 Claims, 6 Drawing Figures

METHOD OF REMOVING WATER FROM EARTHEN PITS

Background of the Invention

1. Field of the Invention

The present invention relates to a method of removing water from earthen pits, and more particularly, but not by way of limitation, to a method of removing an earthen pit containing an aqueous well drilling fluid from the site thereof wherein the aqueous fluid is removed from the pit and the pit filled in with earth.

2. Description of the Prior Art

In the drilling and completion of oil and gas wells, it is necessary that a reserve supply of drilling fluid be maintained at the surface. Drilling fluid is circulated through the reserve supply which allows cuttings to be removed from the drilling fluid and the drilling fluid to be otherwise conditioned prior to being injected into the well bore. In addition, the reserve supply of drilling fluid is needed if excess drilling fluid loss in the well bore occurs due to encountering thief zones, etc.

The most commonly used and economical technique for storing a reserve supply of drilling fluid during drilling operations is to form an earthen pit adjacent the drilling site through which the drilling fluid is circulated. Drilling fluids are generally water based fluids which have solids suspended therein for increasing the density of the fluid, preventing excess fluid loss to permeable formations, increasing the viscosity of the fluid, etc. As mentioned above, the drilling fluid circulated out of the well bore is flowed into the pit and drilling fluid circulated into the well bore is withdrawn from the pit.

At the termination of drilling and completion operations, one or more earthen pits containing aqueous well drilling fluid must be removed from the drilling site, i.e., filled in with earth and graded so that the site of the pit or pits can be returned to agriculture or other use. A problem in the removal of earthen pits containing aqueous well drilling fluid is the disposal of the fluid. While the drilling fluid could be hauled to an alternate disposal site if one was available, such hauling is expensive and because the drilling fluid contains various weighting agents and other chemicals, it cannot be indiscriminately dumped.

By the present invention a method of removing water from aqueous drilling fluids contained in an earthen pit whereby the pit can be filled in and removed is provided which is inexpensive to carry out and which allows the disposal of the solids and other chemicals in the aqueous drilling fluid at the site of the earthen pit.

Summary of the Invention

A method of removing water from an earthen pit is provided comprising the steps of placing a plurality of spray nozzles around the periphery of the pit, the nozzles being directed towards the center of the pit, and pumping water from the pit through the spray nozzles whereby the water is sprayed towards the center of the pit and removed therefrom by the evaporation thereof. A method is also provided for removing an earthen pit containing an aqueous well drilling fluid from the site thereof.

It is, therefore, a general object of the present invention to provide a method for removing water from earthen pits.

A further object of the present invention is the provision of a method for removing an earthen pit containing aqueous well drilling fluid from the site thereof wherein a major portion of the water making up the aqueous drilling fluid is first removed from the pit.

Yet a further object of the present invention is the provision of a method of removing water from an earthen pit which is easily carried out and which allows the filling in of the pit and the disposal of solid materials from the aqueous drilling fluid at the site of the pit in a relatively short period of time.

Other objects, features and advantages of the present invention will be readily apparent to those skilled in the art upon a reading of the description of preferred embodiments which follows, when taken in conjunction with the accompanying drawings.

Brief Description of the Drawings

FIG. 4 is a side sectional view similar to FIG. 3 illustrating apparatus positioned adjacent an earthen pit which includes a floating splash plate.

FIG. 5 is a front view of the apparatus shown in FIG. 4.

FIG. 6 is a side cross-sectional view of an earthen pit containing water and having apparatus for carrying out the method of the present invention positioned adjacent thereto.

Description of Preferred Embodiments

Figure 1:
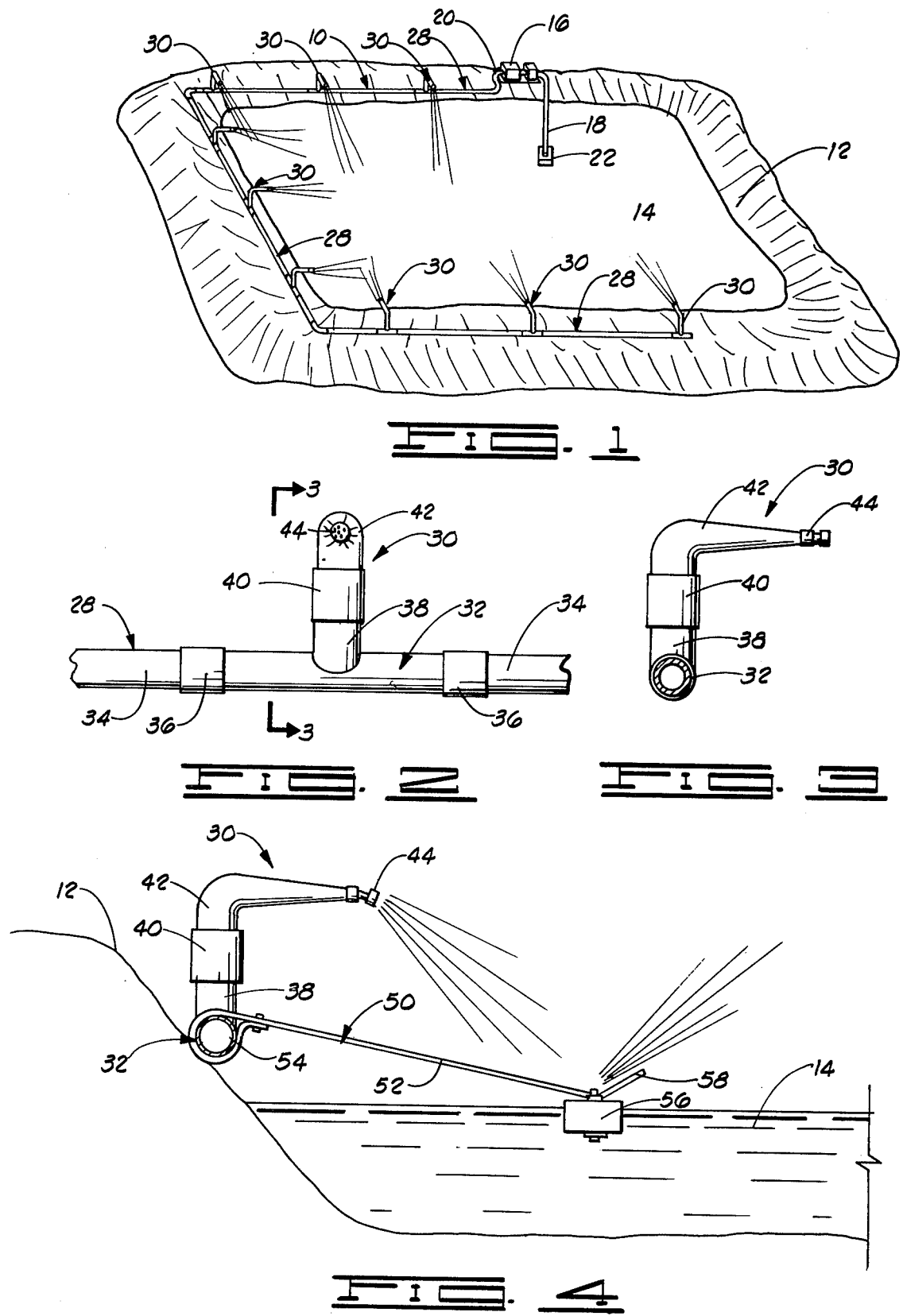
FIG. 1 is a perspective view of an earthen pit containing an aqueous fluid with apparatus for carrying out the method of the present invention positioned adjacent thereto.

Referring now to the drawings and particularly to FIGS. 1 and 6, apparatus for carrying out the method of the invention is illustrated and generally designated by the numeral 10. The apparatus 10 is positioned adjacent an earthen pit 12 which contains a body of water or aqueous well drilling fluid 14. The apparatus 10 is comprised of a gasoline or diesel engine driven pump 16, the suction connection of which is attached to a suction hose 18 and the discharge connection of which is attached to a conduit 20.

As shown in FIG. 6, the suction hose 18 is positioned a distance beneath the surface of the body of fluid 14 in the pit 12 and is maintained at such distance by a float 22 to which the end of the hose 18 is attached by appropriate elongated support means 24. The open end of the hose 18 includes the usual screen 26 to prevent large solid particles from entering the suction connection of the pump 16.

The conduit 20 connected to the discharge connection of the pump 16 is in turn connected to a string 28 of connected conduits. The conduit string 28 is positioned around the periphery of the pit 12 and body of fluid 14 therein. The conduit string 28 is preferably comprised of a purality of sections of conventional irrigation pipe connected together by the usual couplings. Disposed in the conduit string 28 at a spacing of from about twenty feet to about thirty feet are a plurality of spray nozzle assemblies 30. As will be described below, the spray nozzle assemblies 30 are directed towards the center of the pit 12 and water from the pit is continuously pumped by the pump 16 from the body of fluid in the pit by way of the suction hose 18 through the spray nozzle assemblies 30 by way of the conduit string 28.

Figure 2:
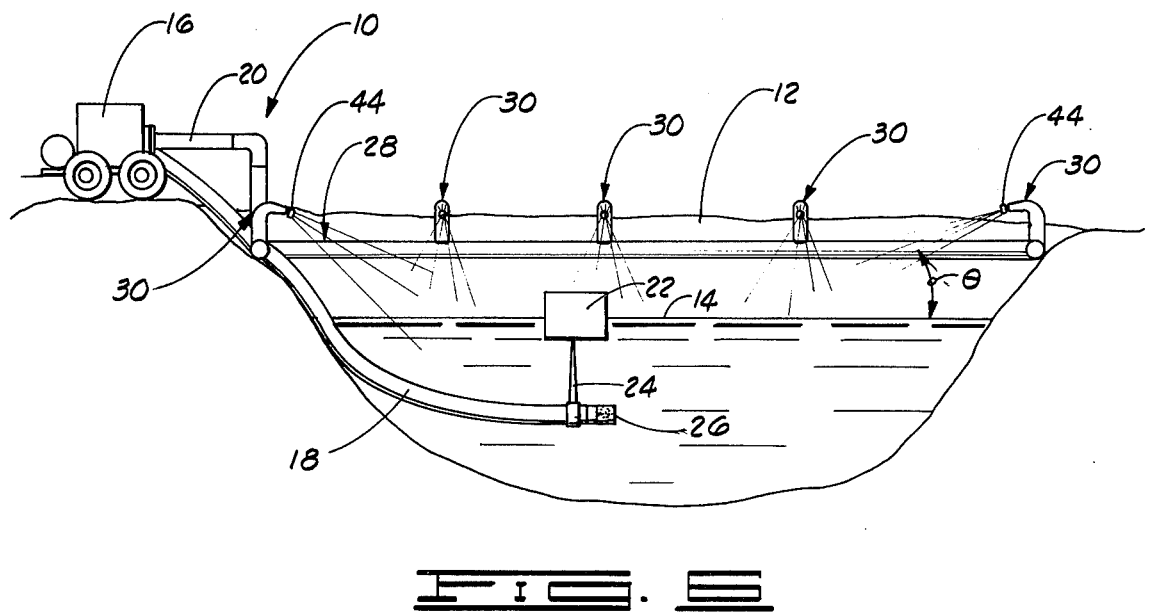
FIG. 2 is an enlarged partial view of a portion of the apparatus of FIG. 1.
Figure 3:
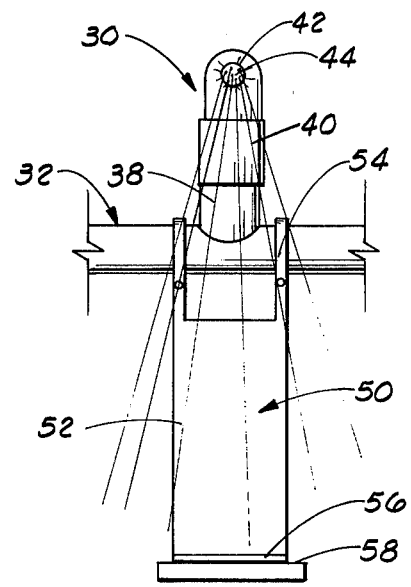
FIG. 3 is a side sectional view taken along line 3—3 of FIG. 2.

Referring specifically to FIGS. 2 and 3, one of the spray nozzle assemblies 30 is shown in detail. While the spray nozzle assemblies 30 can take various forms, in a presently preferred form, a tee fitting 32 is provided which is connected between adjacent ends of conduit sections 34 by conventional connectors 36. The tee fitting 32 is positioned so that the transverse leg 38 thereof extends upwardly. Connected to the leg 38 by a conventional connector 40 is a reducing elbow fitting 42 and threadedly attached to the end of the elbow fitting 42 is a conventional pivotable spray nozzle 44.

Operation of the Apparatus 10

In carrying out the method of the present invention using the apparatus 10, once the apparatus 10 has been installed adjacent a pit containing water as illustrated in FIGS. 1 and 6, with the suction end of the hose 18 positioned beneath the surface of the water, the pump 16 is started whereby water is continuously withdrawn from the body of water 14 and pumped through the conduit 20 and conduit string 28 to the spray nozzle assemblies 30. Each of the spray nozzles 44 is directed towards the center of the pit 12 and the water pumped through the spray nozzles 30 is mistified and directed towards the center of the pit 12. In addition, the nozzle assemblies 30 are positioned above the surface of the body of water 14 contained in the pit 12 and the spray nozzles 44 thereof are directed downwardly towards the surface at an angle with respect to the surface of about 45°. That is, referring to FIG. 6, the angle O between the general direction of the water being sprayed by the spray nozzles 44 and the surface of the water is preferably about 45°. At such angle, the sprayed water which does not evaporate strikes the surface of the body of water 14 causing it to be agitated and additional evaporation to take place from the surface. Yhe circulation of the water from the pit 14 through the spray nozzles 44 is continued until a major portion of the water has been evaporated and removed from the pit 12.

In carrying out the method of the present invention for removing an earthen pit containing an aqueous well drilling fluid from the site thereof, the aqueous drilling fluid in the pit is allowed to stand undisturbed for a period of time whereby solids contained in the fluid gravitate to the bottom of the pit 12. The apparatus 10 is then installed in the manner illustrated in FIGS. 1 and 6 and the suction end of the hose 18 is positioned a distance below the surface of the body of fluid 14 in the pit 12 such that the suction end of the hose is as close to the surface of the body of liquid as possible without a vortex being created therein whereby air is sucked into the hose. Generally, the suction end of the hose 18 is positioned a distance below the surface of the body of fluid equal to three times the diameter of the hose 18 and maintained in such position by the float 22 and connecting means 24 attached thereto.

The pump is started and water is circulated through the apparatus 10 whereby it is caused to evaporate. Once a major portion of the water contained in the pit 12 has been evaporated, the apparatus 10 is removed therefrom and earth is filled in on top of the remaining water and solids in the pit 12. Once the pit 12 has been filled with earth the site is graded whereby it is returned to its normal mode of use such as for agricultural purposes, etc.

Referring now to FIGS. 4 and 5, a plash plate, generally designated by the numeral 50 is illustrated attached to one of the spray nozzle assemblies 30. The plash plate 50 is comprised of an elongated plate 52 pivotally attached to the horizontal legs of the tee fitting 32 of the assembly 30 at one end by a pair of bolted brackets 54 and supported above the surface of the body of water 14 at the other end thereof by a float 56 attached thereto. The end portion 58 of the plate 52 is inclined upwardly with respect to the remaining portion of the plate 52. A splash plate 50 is optionally connected to each of the spray nozzle assemblies 30 and in operation of the apparatus, the splash plate 50 causes at least a portion of the water sprayed through the spray nozzle 44 to impinge thereon and thereby further break up the water droplets and cause a high rate of evaporation.

In order to facilitate a clear understanding of the method of the present invention, the following example is given.

Example

The apparatus 10 is installed on an earthen pit containing a body of aqueous drilling fluid 200 feet wide, 400 feet long and an average of 6–8 feet deep. The apparatus 10 includes 30 spray nozzles assemblies 30 connected thereto and the spray nozzles 44 thereof are directed from a position above the surface of the body of fluid in the pit towards the surface at an angle of about 45°. In addition, all of the nozzles 44 of the assemblies 30 are directed towards the center portion of the pit. The pump 16 is comprised of a Birkley Model pump driven by a 270 cubic inch John Deere diesel engine. The conduit string 28 is comprised of joints of common irrigation pipe.

After the aqueous drilling fluid in the earthen pit is allowed to stand and solids contained therein to settle for a period of X days, the pump of the apparatus 10 is started and water is circulated through the spray nozzles for a period of Y days. At the end of X+Y days the surface of the body of fluid in the pit is lowered by three feet due to evaporation of the water and the remaining water and solids are readily covered with earth when the earthen pit is filled in.

Thus, the present invention is well adapted for carrying out the objects and attaining the ends and advantages mentioned as well as those inherent therein. While presently preferred embodiments of the invention have been described for purposes of this disclosure, numerous changes in the arrangement of steps and parts can be made by those skilled in the art, which changes are encompassed within the spirit of this invention as defined by the appended claims.

What is claimed is:

1. A method of removing an earthen pit containing aqueous well drilling fluid from the site thereof comprising the steps of:
   allowing solids suspended in said drilling fluid to settle to the bottom portion of said pit;
   placing a plurality of spray nozzles around the periphery of said pit, said nozzles being directed towards the center of said pit;
   pumping water from the top portion of said pit through said spray nozzles whereby said water is sprayed towards the center of said pit until a major portion of said water is removed therefrom by evaporation; and covering the remaining minor portion of water and settled solids and filling in said pit with earth to thereby remove said pit.

2. The method of claim 1 wherein said spray nozzles are positioned above the surface of water in said pit and are directed downwardly towards said surface.

3. The method of claim 2 wherein said spray nozzles are directed whereby the water sprayed therefrom contacts the surface of the water in said pit at an angle of about 45°.

4. The method of claim 1 wherein at least 30 spray nozzles are placed around said pit.

5. The method of claim 1 which is further characterized to include the step of placing a splash plate in front of each of said spray nozzles whereby water sprayed from said spray nozzles contacts said splash plates causing said water to be further broken up into fine droplets and evaporated at a faster rate.

* * * * *